June 9, 1936.    B. C. PLACE    2,043,865
SECURING ELECTRICAL COVER OR ESCUTCHEON PLATE
Filed Jan. 9, 1931
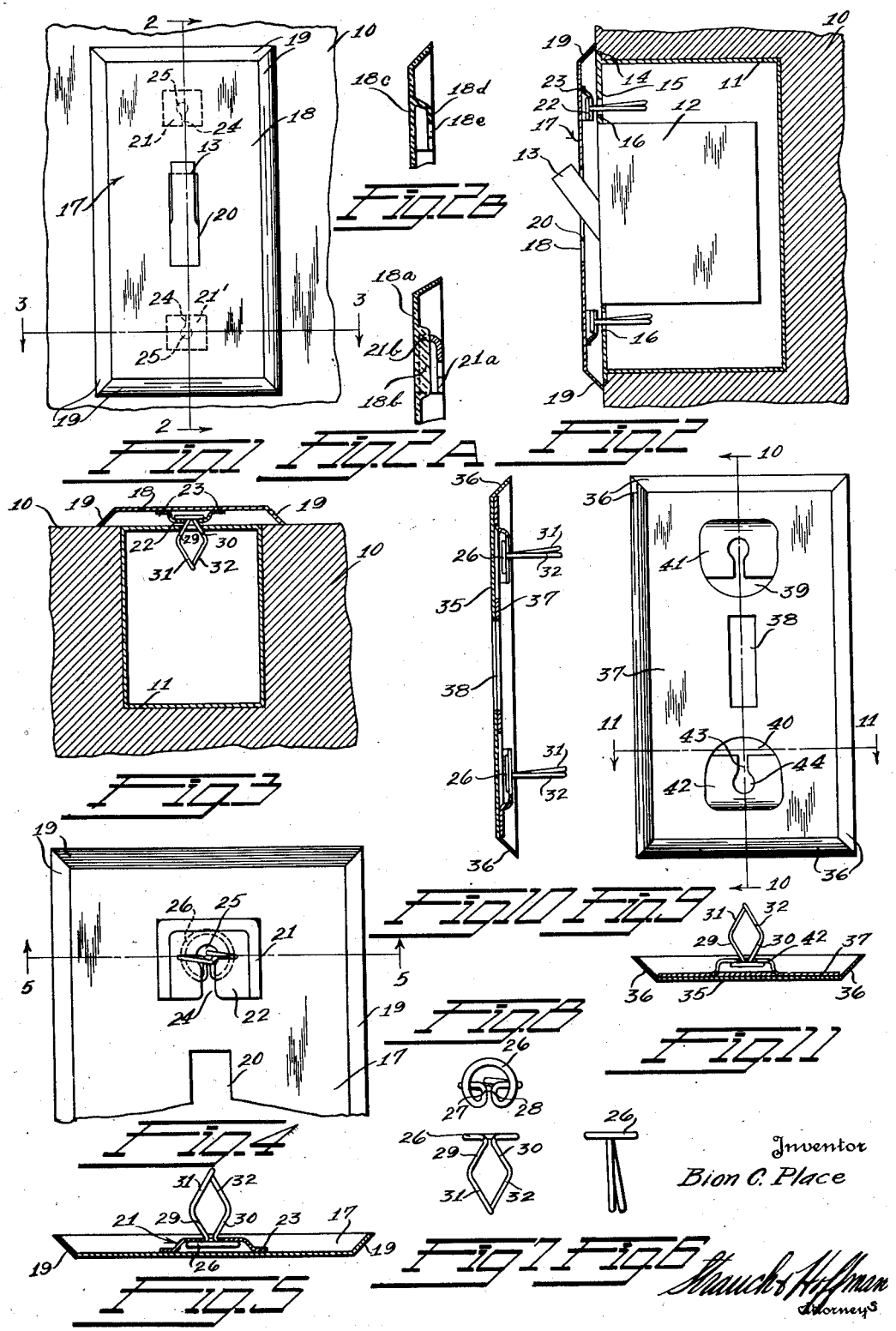
Inventor
Bion C. Place Patented June 9, 1936

2,043,865

UNITED STATES PATENT OFFICE 2,043,865

SECURING ELECTRICAL COVER OR ESCUTCHEON PLATE

Bion C. Place, Detroit, Mich., assignor of one-half to George E. Gagnier, Detroit, Mich.

Application January 9, 1931, Serial No. 507,681

9 Claims. (Cl. 247—23)

This invention relates to an improved method and arrangement of securing cover plates for electrical switches or for securing escutcheon plates of any character in position by means that are invisible when the plate is viewed from the exterior, and in which the fastening means utilized serves to hold the plates in position resiliently so that they may be readily removed by simply prying them away from the supporting structure.

Cover plates for electrical switch boxes, set in the walls of buildings for example, are usually secured in position by means of screws that pass through openings in the cover plate. Since the heads of the screws are visible this manner of attachment of cover plates is objectionable because of the appearance of the screw heads. Furthermore, the arrangement generally used is not entirely satisfactory, because of the fact that it is frequently difficult to bring about exact registry of the screws with the openings in the supporting elements for the plates, designed to receive the threaded shanks thereof. Accordingly it is frequently difficult to readily apply the screws in positioning the cover plate resulting in a large waste of time in the installation of said plates. Furthermore in view of the unyielding manner of drawing the cover plates in position by screws, said plates frequently are not drawn snugly against the surrounding surfaces at all points.

It has heretofore been proposed in order to avoid the objections just referred to, to utilize snap fasteners that are invisible from the exterior of the plate to secure such plates in position, but such arrangements have not been entirely satisfactory, because the fasteners used were of the type that also required a relatively exact registry of the cover plate with the fastening elements in order that they would be brought into proper interlocked engagement, or the arrangement was relatively complex and expensive by requiring the use of intermediate attaching plates between the switch and the cover plates to enable the plates to be snapped into position.

This invention aims to provide a construction for securing cover or escutcheon plates in position over an electrical switch, or in position around door knobs or in similar situations, in which fasteners of an extremely simple and inexpensive form are assembled with the cover or escutcheon plate before the application of the latter in operative position, which fasteners have shanks that are expansible and contractible to a large degree, which shanks may readily be brought into engagement with the sockets provided to receive them, irrespective of the exact registry of the sockets with the fasteners anchored to the plate, and which fasteners, when in operative position, serve to exert a continuously applied yielding pressure tending to draw the plates into position without regard to the accuracy of the alignment of the fasteners and the sockets provided to receive them.

This invention also aims to provide a method of securing cover plates removably in position by first attaching the fastener anchoring member to the rear surface of the plate, which fastener anchoring member is shaped so as to permit the ready assembling and interlocking of a headed fastener with said member, in then inserting and interlocking said fastener to said member, and finally positioning the cover plate by causing the yielding shank of the fastener to enter a socket within the supporting structure, of whatever nature, so as to cause the said yielding shank to draw the cover plate firmly into position.

A further object of the invention is to provide a cover plate with means secured to the rear face thereof, permitting the ready assembly of detachable fasteners with respect to the cover plate by inserting the heads thereof, between a portion of said member that is spaced from said rear surface and the rear surface of the cover plate.

A further object of the invention is to provide a cover plate, the body of which is made of pressed fibrous material in dished form, and including a further fibrous plate attached within the dished portion thereof, said fiber plate being provided with portions formed to receive and interlock headed spring fasteners therewith, prior to the application of the whole cover plate in position.

Further objects of the invention will appear as a description thereof, proceeds with reference to the accompanying drawing in which:

Figure 1 is a fragmentary front elevational view of a cover plate applied in accordance with this invention.

Figure 2 is a vertical sectional view taken on the plane indicated by the lines 2—2 in Figure 1.

Figure 2a is a fragmentary sectional view of a slightly modified form of the arrangement of Figure 2 showing a cover plate of initially plastic material.

Figure 2b is a fragmentary sectional view of a further slight modification constructed of initially plastic material and illustrating a unitary construction.

Figure 3 is a transverse sectional view taken on the plane indicated by the lines 3—3 of Figure 1.

Figure 4 is a fragmentary rear view of a portion of a cover plate including an anchoring member having a fastener received therein, prior to the application of the cover plate to a supporting structure.

Figure 5 is a transverse sectional view taken on the plane indicated by the line 5—5 of Figure 4.

Figures 6, 7, and 8 are, respectively, end and side elevations and a plan view of the preferred form of spring fastener utilized to secure the cover plates removably in position.

Figure 9 is a rear view of a cover plate structure formed of compressed fibrous material constituting a modified form of the invention.

Figure 10 is a longitudinal section of the cover plate illustrated in Figure 9, said section being taken on the line indicated by the lines 10—10 in Figure 9.

Figure 11 is a sectional view taken on the plane indicated by the line 11—11 in Figure 9.

Like reference characters indicate like parts throughout the several figures.

The invention presently to be described has been illustrated as applied to the securing of cover plates for electrical switches mounted in outlet boxes disposed in walls of buildings, for example. It should be understood, however, that the invention is capable of being used in securing escutcheon plates of any character in position, and that the securing of electrical switch cover plates is selected merely in order to clearly illustrate one application of the invention.

The wall of a building is designated by the numeral 10. Said wall, as is customary, may be provided with an outlet box 11, disposed in a recess in said wall, said box receiving an electrical switch 12 of any approved form. Switch 12, provided with a pivoted switch operating lever 13, is selected for illustration in the drawing. The box 11, may be secured in the wall in any desired manner as by providing it with flanges 14, that may be seated in recesses in the wall and suitably attached thereto in any approved way. The box 11 may be provided with inwardly projecting tongues or flanges 15, each of said tongues or flanges is provided with a perforation of any suitable form constituting, in effect, a socket designed to receive the resilient shank of a spring fastener presently to be described. Any other suitable arrangement, providing a plurality of perforations or sockets in the supporting structure to receive the fasteners in the cover plate may be provided, as may be deemed desirable.

A metallic cover plate 17 of dished form (Figs. 1-5) may be used, said plate having the body 18, thereof, spaced from the wall to which the cover plate is applied, by the beveled or inclined integral flanges 19, that are formed around the margins of said plate. The cover plate 18 is provided with a slot 20 positioned to receive the switch operating lever 13. It will be readily understood that the cover plate may assume any form and any external configuration, ornamental or otherwise, the shape of the plate constituting no part of the present invention. Said invention consists in the manner of attaching a cover plate, such as just described, in position over a switch box of the kind generally above described, or any other equivalent arrangement.

To this end, fastener anchoring members are attached to the under surface of the cover plate by means which do not penetrate said plate. In the form of the invention shown in Figures 1 to 5, the fastener anchoring members, designated by the numeral 21 and 21', are constructed in the form of small metallic tabs or socket members. Said members are attached to the under side of the cover plate by welding, soldering, or in any other manner, but preferably without complete penetration of the plate. Each fastener anchoring member is, preferably, constructed so that the central portion 22, thereof, is raised above the margins 23, thereof sufficiently to just receive the head of the fastener, hereinafter described, between said raised portion and the under surface of the cover plate. The raised portion 22 extends through one of the margins of said anchoring members, so as to provide space to permit the head of the fastener to be slid between said anchoring member and the rear of the cover plate from one side of said member. Preferably, each cover plate is provided with a pair of fastener anchoring members. As illustrated in Figures 1 and 2, the fastener anchoring members 21 and 21' are secured to the rear of the cover plate so that the margins, thereof, that are free of attachment to the cover plate are disposed adjacent each other for a purpose hereinafter described. The fastener anchoring members 21 and 21' may assume any desired outline.

The raised portion of the body of the fastener anchoring member is provided with a slot 24, opening from the margin thereof that is free of attachment to the cover plate, the slot 24 opening into a larger aperture 25 of suitable configuration, said slot and apertures being provided to facilitate the assembly of the fastener with respect to the cover plate and for interlocking it therewith, as hereinafter described.

If desired, the cover plate may be constructed of initially plastic material, such as vulcanized hard rubber, phenol condensate product or similar material, instead of metal. When such arrangement is used the metal tabs or socket members may be provided with projections of suitable form whereby the tabs may be secured to the cover plate by embedding the projections in the plastic material. One arrangement of this character is illustrated in Figure 2a in which 18a indicates a cover plate of suitable initially plastic material. In order to give to the plate sufficient thickness to permit the embedding of the fastener anchoring members, said plate may be provided with thickened portions 18b. The fastener anchoring members 21a, which are similar to the members 21 above described, are provided with suitable projections 21b so that they may be secured with reference to the cover plate 18a by embedding said projections in the material of which the plate is formed, while the material is still plastic. Said projections may assume any convenient form, such as outwardly flaring flanges, as illustrated, for example.

A unitary construction having the fastener anchoring members formed as integral parts of the plate may be used, when the plate is constructed of material that is initially plastic and capable of being molded. Such an arrangement is illustrated in Figure 2b in which the plate 18c is provided with a fastener anchoring member 18d in form similar to the metallic member 21 before described. The member 18d is provided with a keyhole slot 18e to permit the interlocking of the fastener with the member 18d as above described.

The spring or snap fasteners used to secure the cover plate in position may assume any desired form, though preferably the fastener is of the one-piece wire type, in which the piece of wire is bent to provide a head and an expansible and contractible shank projecting away from the head in planes substantially normal to the head. Such a fastener is disclosed in my Patent #1,679,266, granted July 31, 1928, and is illustrated in Figures 6, 7, and 8.

As shown in these figures, the mid-portion of the piece of wire, from which the fastener is formed, is bent into the form of a loop 26 constituting the head of the fastener. The portions of the wire adjacent the ends of the loop 26, are then turned inwardly in the plane of the loop to form arms 27 and 28, that are subjected to torsional stresses, when the shank of the fastener is expanded and contracted. The ends of the wire are then bent in planes substantially normal to the head and said ends provide an expansible and contractible shank for the fastener. The ends of the fastener constituting the shank thereof are bowed outwardly between the tips of said ends and the loop constituting the head, as illustrated, to form divergently disposed holding portions 29 and 30 and convergently disposed guiding portions 31 and 32. The tips of the wire, preferably, being disposed in slightly lapped relation to permit the ready entry of the shank of the fastener in the opening or socket provided to receive it.

Such a fastener has an expansible and contractible shank, that has a major dimension measured across the outwardly bowed portion of the legs constituting said shank, and a minor dimension, which is measured in a direction at right angles to that of the major dimension. It will be readily understood that a substantial difference exists between said dimensions.

The fastener is assembled with respect to the fastener anchoring members 21 and 21' by inserting the head of the fastener between the raised body portion of the fastener anchoring member and the rear of the cover plate, as illustrated, and by causing the fastener to pass through the slot 24 with the minor dimension of the shank across said slot, and into the aperture 25. After the fastener is brought into this position it is turned through 90° to bring the major dimension of the shank across said aperture and thus bring about an interlocking between the fastener and the fastener anchoring member, that will not permit disassembly of the fastener from the anchoring member in any linear direction.

Each of the fastener anchoring members is provided with a fastener in the manner just described. The cover plate is then ready for attachment in operative position by causing the tips of the legs constituting the shanks of the fasteners to be brought opposite apertures 16 in the supporting structure of whatever nature. Pressure is then exerted against the cover plate causing the shanks of the fasteners to enter said perforations. When such pressure is applied the converging guiding portions 31 and 32 engage the edges of the openings 16, causing the legs of the fasteners to be sprung together, thus contracting the shank of the fastener. The apertures 16 have a diameter much less than the major transverse diameter of the shank of the fastener, and accordingly after the convergently disposed guiding portions have passed through said apertures, the legs of the fasteners spring apart causing the divergently disposed holding portions 29 and 30 to firmly grip the edges of the aperture. As the legs of the fastener spring apart, and the shanks thereof thus expand, a yielding wedging action is exerted tending to draw the cover plate firmly into position, and to maintain it resiliently in place. It will be readily understood that it is immaterial whether the tips of the shank of the fastener register exactly with the aperture 16, because of the large degree of capability of contraction of said shank after the fastener has been entered therein. If exact registry of the apertures 16 and the shank of the fastener does not exist, one or the other of the legs constituting said shank are bent to a greater degree than the other, though the fastener cannot tilt laterally in view of the fact that the heads thereof are disposed against the under surface of the cover plate and between said surface and the fastener anchoring member.

Inasmuch as the slots in the anchoring members 21 and 21' face in opposite directions, it will be readily understood that the cover plate cannot be removed by manipulation thereof to free the heads of the fasteners from the fastener anchoring members, that is, the movement from the cover plate in any direction is positively resisted by the fasteners disposed in said anchoring members. The cover plate can, however, be readily removed when necessary by simply prying it away from the supporting structure, and contracting the resilient shanks of the spring fasteners so as to permit the withdrawal thereof from the apertures or sockets that receive them. It can be readily replaced in the same way it was applied.

The invention so far described has been applied to the attachment of metallic cover plates in position, in such manner that they may be readily removed and replaced by fastening means that is invisible, and that in operation exert a continuously effective pressure tending to draw the cover plate firmly in position providing a neat joint between the wall surface and the edges of the cover plate at all times.

The invention is also applicable to the ready attachment of cover plates constructed of compressed fiber. Cover plates of this character are illustrated in Figs. 9, 10 and 11 of the drawing, in which a fiber plate 35, having inclined margins 36, similar to the metallic plate above described, is utilized. Said plate 35 may be ornamented in any manner, and formed in any desirable outline though it is preferably of dished form, providing space between the rear face thereof and the wall against which it is designed to be attached so as to permit the assembly of the fasteners in said space. The fastener anchoring member in this form of the invention constitutes a second fiber plate 37, preferably fitting snugly between the inclined flanges 36 of the plate 35. Said member is cemented or otherwise secured thereto in a manner so that the attaching means is invisible from the exterior of the completed cover plate. The cover plate 35 and the anchoring member 37 are jointly slotted at 38 for the passage of the switch operating device.

In order to permit the ready assembly of headed spring fasteners, of the kind above described, with this form of cover plate, the anchoring member 37, is provided with openings 39 and 40 of any suitable form, but shaped to permit the passage of the head of the fastener beneath raised portions 41 and 42 that are pressed away from the plane of the body of the fastener anchoring member 37 sufficiently to permit the heads of the fasteners to be snugly disposed between said raised portions and the rear of the dished fibrous cover plate member 35. Each of the raised portions 41 and 42 are provided with a slot 43 opening into an aperture 44, similar to the slot 24 and aperture 25 in the form of the invention first described and providing means to permit the assembly and interlocking of the fasteners with the cover plate.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A cover plate of dished form having a fastener anchoring member attached to the rear face thereof by means invisible from the front face thereof adjacent a point thereof where a fastener is to be applied, said anchoring member having a part thereof spaced from said rear face so that the head of a headed fastener may be received between said member and said rear face, and having an open slot formed therein to pass the head of said fastener by lateral movement thereof between said member and rear face, said slot being shaped to interlock said fastener and member from substantial movement endwise of said slot.

2. A cover plate of dished form having fastener anchoring members attached permanently to the rear face thereof adjacent the points at which fasteners are to be applied by means invisible from the front face, each of said anchoring members having a portion thereof spaced from said rear face to provide room for the head of a fastener, the spaced portion having a slot a part of which is formed to permit the passing of said head between said member and plate and another part to interlock said fastener from substantial movement along said slot after it is brought into said last named part.

3. In combination with a switch set in a wall, means to secure a cover plate over said switch comprising supporting means provided with perforations, a cover plate, and headed spring fasteners anchored with respect to said cover plate and each having expansible and contractible shanks including a pair of divergently disposed legs designed to enter said perforations and yieldingly drawing said cover plate toward said supporting means irrespective of the exact alignment of the fasteners and said perforations.

4. In combination with a switch set in a wall, means to secure a cover plate over said switch comprising supporting means provided with perforations, a cover plate, and headed spring fasteners anchored with respect to said cover plate and each consisting of a single piece of spring wire bent to form a head and divergently disposed holding elements located in planes approximately normal to the plane of said head, said last named elements being entered in said perforations and exerting a yielding wedging action tending to draw said cover plate into operative position.

5. In combination with a wall provided with a projection extending away therefrom, an escutcheon plate covering said wall around said projection, sockets in said wall to receive the shanks of removable headed spring fasteners, and headed spring fasteners having their heads disposed against the rear face of said plate and attached thereto by means lapping a portion of the heads of the fasteners without perforation of said plate and the shanks sprung into said sockets.

6. The combination defined in claim 5, in which said shanks include a pair of wire legs disposed so as to provide divergently arranged holding portions exerting a yielding pull on said plate drawing it toward said wall.

7. A cover plate consisting of a body of dished form constructed from initially plastic material, and metal fastener anchoring plates embedded at their edges in said material, a portion of each said plates being spaced from said body and being provided with an open ended slot having a narrow portion for the passage of a fastener and a wider portion for the interlocking of the fastener to said plate.

8. A unitary cover plate in dished form provided at its under surface with an integral hollow fastener receiving element, the body of said element being spaced from said plate and provided with an open ended slot having a widened part designed to interlock a fastener with said element.

9. A cover plate having a plurality of fastener anchoring members secured to the rear thereof so as to be invisible from the front of the plate, each member having a portion thereof spaced from the plate so as to permit the head of a fastener having a shank formed so as to have a major and minor transverse dimension to be passed between said plate and member, and an irregular open ended slot in said portion of each member formed so that the minor dimension of the shank of the fastener may be passed through one part thereof and so that the fastener may be interlocked with respect to said member by shifting of the fastener so that the major dimension may extend across another part of said slot.

BION C. PLACE.

CERTIFICATE OF CORRECTION.

Patent No. 2,043,865. June 9, 1936.

BION C. PLACE.

It is hereby certified that error appears in the printed specification of the above numbered patent requiring correction as follows: Page 4, first column, line 24-25, claim 1, strike out the words "adjacent a point thereof where a fastener is to be applied " and insert the same after "thereof" in line 23, same claim; and that the said Letters Patent should be read with this correction therein that the same may conform to the record of the case in the Patent Office.

Signed and sealed this 25th day of August, A. D. 1936.

(Seal)

Leslie Frazer
Acting Commissioner of Patents.